(12) United States Patent
Okawa et al.

(10) Patent No.: US 9,845,724 B2
(45) Date of Patent: Dec. 19, 2017

(54) INTERNAL COMBUSTION ENGINE

(71) Applicant: TOYOTA JIDOSHA KABUSHIKI KAISHA, Toyota-shi, Aichi (JP)

(72) Inventors: Makoto Okawa, Toyota (JP); Kazuhito Sakai, Mishima (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 10 days.

(21) Appl. No.: 15/102,747

(22) PCT Filed: Nov. 18, 2014

(86) PCT No.: PCT/JP2014/080479
§ 371 (c)(1),
(2) Date: Jun. 8, 2016

(87) PCT Pub. No.: WO2015/087662
PCT Pub. Date: Jun. 18, 2015

(65) Prior Publication Data
US 2016/0319736 A1    Nov. 3, 2016

(30) Foreign Application Priority Data

Dec. 10, 2013 (JP) .................. 2013-255032

(51) Int. Cl.
*F02B 75/04* (2006.01)
*F02D 15/04* (2006.01)
*F02F 1/18* (2006.01)
*F16D 41/08* (2006.01)
(Continued)

(52) U.S. Cl.
CPC ............ *F02B 75/041* (2013.01); *F02D 15/04* (2013.01); *F02F 1/18* (2013.01); *F02F 7/0002* (2013.01); *F16D 15/00* (2013.01); *F16D 41/08* (2013.01)

(58) Field of Classification Search
CPC ........ F02B 75/041; F02B 75/04; F02D 15/04; F02D 15/00; F02F 7/0002; F02F 1/18; F16D 15/00
See application file for complete search history.

(56) References Cited

U.S. PATENT DOCUMENTS

2008/0178857 A1* 7/2008 Kamiyama ............... F02F 7/00
123/78 C
2012/0215423 A1* 8/2012 Sakayanagi ........... F02B 75/041
701/104

FOREIGN PATENT DOCUMENTS

JP    2005-214088 A    8/2005
JP    2014-114733 A    6/2014

* cited by examiner

*Primary Examiner* — Jacob Amick
(74) *Attorney, Agent, or Firm* — Andrews Kurth Kenyon LLP

(57) ABSTRACT

An internal combustion engine comprises a variable compression ratio mechanism that changes the relative position of a cylinder block with respect to a crankcase and a controlling device that controls the variable compression ratio mechanism. The variable compression ratio mechanism contains a driving device that rotates a shaft that includes an eccentric axis, and the drive device includes a clutch that blocks reverse input and is disposed in a drive power transmission route that transmits the rotational power of a motor to the shaft. The control device fixes the mechanical compression ratio to a predetermined low mechanical compression ratio when the amplitude of the rotational power vibration applied to an output shaft of the clutch is less than a predetermined determination value.

5 Claims, 11 Drawing Sheets

(51) Int. Cl.
*F02F 7/00* (2006.01)
*F16D 15/00* (2006.01)

INTERNAL COMBUSTION ENGINE

CROSS-REFERENCE TO RELATED APPLICATIONS

This is a national phase application based on the PCT International Patent Application No. PCT/JP2014/080479 filed Nov. 18, 2014, claiming priority to Japanese Patent Application No. 2013-255032 filed Dec. 10, 2013, the entire contents of both of which are incorporated herein by reference.

TECHNICAL FIELD

The present invention relates to an internal combustion engine.

BACKGROUND ART

In a combustion chamber of an internal combustion engine, a mixture of air and fuel is compressed and then is ignited in that state. It is known that the compression ratio when compressing the air-fuel mixture can affect the output of the internal combustion engine and the amount of fuel consumption. By raising the compression ratio, the output torque can be made larger and the thermal efficiency can be improved. In this regard, if making the compression ratio too high, it is known that knocking and other abnormal combustion will occur. In the prior art, an internal combustion engine changing the compression ratio during its operating period has been known.

Japanese Patent Publication No. 2005-214088A discloses a variable compression ratio engine able to make a reciprocating operating member advance and retract so as to change the position where a piston reaches top dead center. This variable compression ratio engine uses an actuator mechanism to change the compression ratio. The actual mechanism is provided with a ball screw, a rotation transmission system transmitting rotation of a motor to the ball screw, and a clutch interposed in the rotation transmission system. This publication discloses to employ a reverse input restricting type clutch which transmits rotation from an input member to which drive force of the motor is input to a nut, but which blocks transmission of rotation from the nut to the input member.

CITATION LIST

Patent Literature

PLT 1: Japanese Patent Publication No. 2005-214088A

SUMMARY OF INVENTION

Technical Problem

By employing, as a variable compression ratio mechanism changing a compression ratio, a mechanism changing a volume of a combustion chamber when a piston reaches top dead center, it is possible to make a compression ratio smaller. In an internal combustion engine provided with such a variable compression ratio mechanism, if fuel is burned, pressure of the combustion chamber, that is, the internal cylinder pressure, rises. Further, at the members forming the combustion chamber, the force working in a direction whereby the volume of the combustion chamber becomes larger increases and the force working on the variable compression ratio mechanism also increases.

In the reverse input restriction type clutch of the actuator mechanism disclosed in the above Japanese Patent Publication No. 2005-214088A, the rotational force from the input side to which the actuator is connected is transmitted to the output side, while the rotational force from the output side is blocked by a lock action. Such a reverse input restriction clutch has the characteristic of the rotational force applied to the output shaft due to the pressure inside a cylinder being blocked.

When changing the mechanical compression ratio, it is necessary to release the locked state of the reverse input blocking clutch. In this regard, the output shaft of the reverse input blocking clutch receives rotational force due to the internal cylinder pressure. The internal cylinder pressure changes along with time. Sometimes, to release the lock action, it was necessary to increase the rotational force supplied to the input shaft of the reverse input blocking clutch. For this reason, the motor of the drive device was set large in capacity, the power consumption become larger, and the amount of consumption of fuel by the internal combustion engine became greater. Furthermore, there were the problems that the location where the motor of the drive device was placed became larger or the location for placement of the motor became restricted.

The present invention has as its object to provide an internal combustion engine keeping release of the lock action of the clutch from becoming difficult due to abnormality of the variable compression ratio mechanism, aging deterioration of the parts forming the eccentric shafts, etc.

Solution to Problem

The internal combustion engine of the present invention is provided with a variable compression ratio mechanism able to change a mechanical compression ratio and a control device controlling the variable compression ratio mechanism. The variable compression ratio mechanism includes an eccentric shaft for changing a volume of a combustion chamber when a piston reaches top dead center and a drive device for making the eccentric shaft rotate. The drive device includes a rotary machine and a clutch arranged in a drive power transmission path for transmitting rotational force of the rotary machine to the eccentric shaft. The clutch is formed so as to block rotational force from the output shaft in a rotation direction lowering a mechanism compression ratio transmitted to the output shaft. The internal combustion engine is further provided with a rotational force estimating device estimating a rotational force applied to the output shaft of the clutch. The control device fixes the mechanical compression ratio at a predetermined low mechanical compression ratio when an amplitude of vibration of rotational force applied to the output shaft of the clutch is less than a predetermined judgment value.

In the above invention, the control device can prohibit change of the mechanical compression ratio after fixing the mechanical compression ratio at a predetermined low mechanical compression ratio when an amplitude of vibration of rotational force applied to the output shaft of the clutch is less than a predetermined judgment value.

In the above invention, the control device can control the rotary machine so as to start driving the input shaft of the clutch during a time period when an internal cylinder pressure transits from a local maximum point to a local minimum point when lowering the mechanical compression ratio.

In the above invention, the control device can detect a local maximum point and a local minimum point of vibration of rotational force applied to the output shaft of the clutch and calculate an amplitude of vibration based on the local maximum point and the local minimum point.

In the above invention, the internal combustion engine can further comprise a support structure including a crankcase and a cylinder block supported by the support structure, wherein the variable compression ratio mechanism is interposed between the support structure and the cylinder block and includes a shaft including the eccentric shaft and the drive device making the shaft rotate and is formed to be able to change the mechanical compression ratio by changing a relative position of the cylinder block with respect to the support structure.

Advantageous Effects of Invention

According to the present invention, it is possible to provide an internal combustion engine which keeps release of a locking action of a clutch from becoming difficult due to an abnormality of a variable compression ratio mechanism or aging deterioration of parts forming an eccentric shaft etc.

DESCRIPTION OF EMBODIMENTS

Referring to FIG. 1 to FIG. 14, an internal combustion engine in an embodiment will be explained. In the present embodiment, the explanation will be given illustrating a spark ignition type of internal combustion engine mounted in a vehicle. The internal combustion engine in the present embodiment is provided with a variable compression ratio mechanism able to change the mechanical compression ratio.

Figure 1:
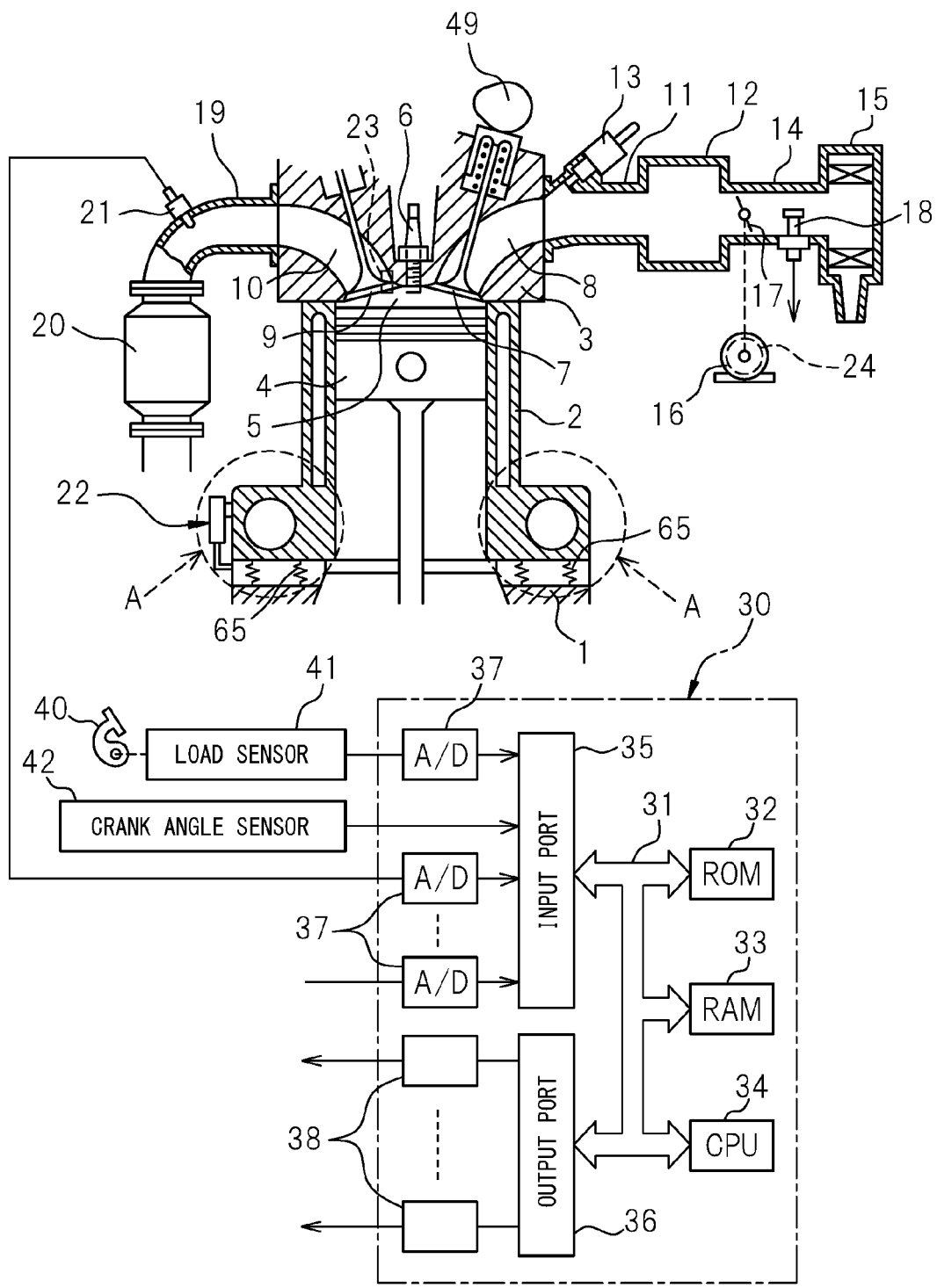
FIG. 1 is a schematic overall view of an internal combustion engine in an embodiment.

FIG. 1 is a schematic view of an internal combustion engine in an embodiment. The internal combustion engine is provided with a support structure including a crankcase 1. The support structure is formed so as to support a crankshaft. The internal combustion engine is provided with a cylinder block 2 and a cylinder head 3. In bores formed inside the cylinder block 2, pistons 4 are arranged. At the center parts at the top surfaces of combustion chambers 5, spark plugs 6 are arranged. In the present invention, at any position of piston 4, the space surrounded by a crown surface of the piston 4, the bore of the cylinder block 2, and the cylinder head 3 is called a "combustion chamber". Further, an internal cylinder pressure sensor 23 is arranged as an internal cylinder pressure detector detecting a pressure of a combustion chamber 5, that is, an internal cylinder pressure.

At the cylinder head 3, intake ports 8 and exhaust ports 10 are formed. At the end parts of the intake ports 8, intake valves 7 are arranged. The intake valves 7 opens and closes by rotation of intake cams 49. At the end parts of the exhaust ports 10, exhaust valves 9 are arranged. The intake ports 8 are connected through intake runners 11 to a surge tank 12. At the intake runners 11, fuel injectors 13 are arranged for injecting fuel toward the insides of the respectively corresponding intake ports 8. Note that, fuel injectors 13 may also be arranged so as to directly inject fuel into the combustion chambers 5 instead of being attached to the intake runners 11.

The surge tank 12 is connected through an intake duct 14 to an air cleaner 15. At the inside of the intake duct 14, a throttle valve 17 driven by an actuator 16 is arranged. Further, at the inside of the intake duct 14 an intake air amount detector 18 using for example heat rays is arranged. On the other hand, the exhaust ports 10 are connected through an exhaust manifold 19 for example to a catalytic device 20 having a three-way catalyst built into it. At the exhaust manifold 19, an air-fuel ratio sensor 21 is arranged.

The internal combustion engine in the present embodiment is provided with a variable compression ratio mechanism A able to change a volume of a combustion chamber 5 when a piston 4 is positioned at compression top dead center. The variable compression ratio mechanism A is formed so as to change the relative position of the cylinder block 2 with respect to the crankcase 1 in the cylinder axial line direction. Between the crankcase 1 and the cylinder block 2, biasing means comprised of springs 65 are arranged. The springs 65 are formed so as to bias the cylinder block 2 in a direction away from the crankcase 1.

At the crankcase 1 and the cylinder block 2, a relative position sensor 22 is attached for detecting a relative position of the cylinder block 2 with respect to the crankcase 1. From the relative position sensor 22, an output signal showing a change in the distance between the crankcase 1 and the cylinder block 2 is output. At the actuator 16 for driving the throttle valve, a throttle opening degree sensor 24 generating an output signal showing a throttle valve opening degree is attached.

The control device of the internal combustion engine in the present embodiment includes an electronic control unit 30. The electronic control unit 30 in the present embodiment includes a digital computer. The digital computer includes components connected with each other by a bidirectional bus 31 such as a ROM (read only memory) 32, RAM (random access memory) 33, CPU (microprocessor) 34, input port 35, and output port 36.

The output signals of the intake air amount detector 18, air-fuel ratio sensor 21, relative position sensor 22, internal cylinder pressure sensor 23, and throttle opening degree sensor 24 are input through corresponding AD converters 37 to the input port 35. Further, an accelerator pedal 40 has a load sensor 41 connected to it which generates an output voltage proportional to an amount of depression of the accelerator pedal 40. The output voltage of the load sensor 41 is input through the corresponding AD converter 37 to the input port 35. Using the output of the load sensor 41, the requested load can be calculated. Furthermore, the input port 35 is connected to a crank angle sensor 42 generating an output pulse every time the crankshaft rotates for example by 30°. From the output of the crank angle sensor 42, the crank angle and engine speed can be detected.

On the other hand, the output port 36 is connected through corresponding drive circuits 38 with spark plugs 6, fuel injectors 13, the actuator 16 for driving the throttle valve, and the variable compression ratio mechanism A. These devices are controlled by the electronic control unit 30.

Figure 2:
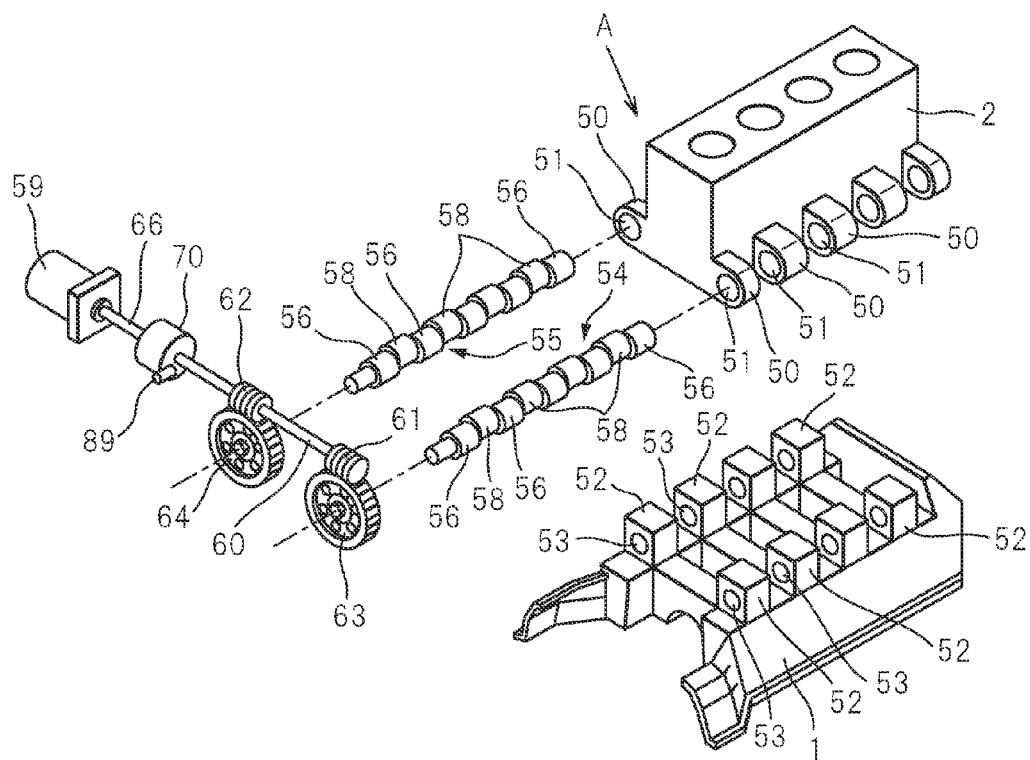
FIG. 2 is a schematic disassembled perspective view of a variable compression ratio mechanism in an embodiment.
Figure 3:
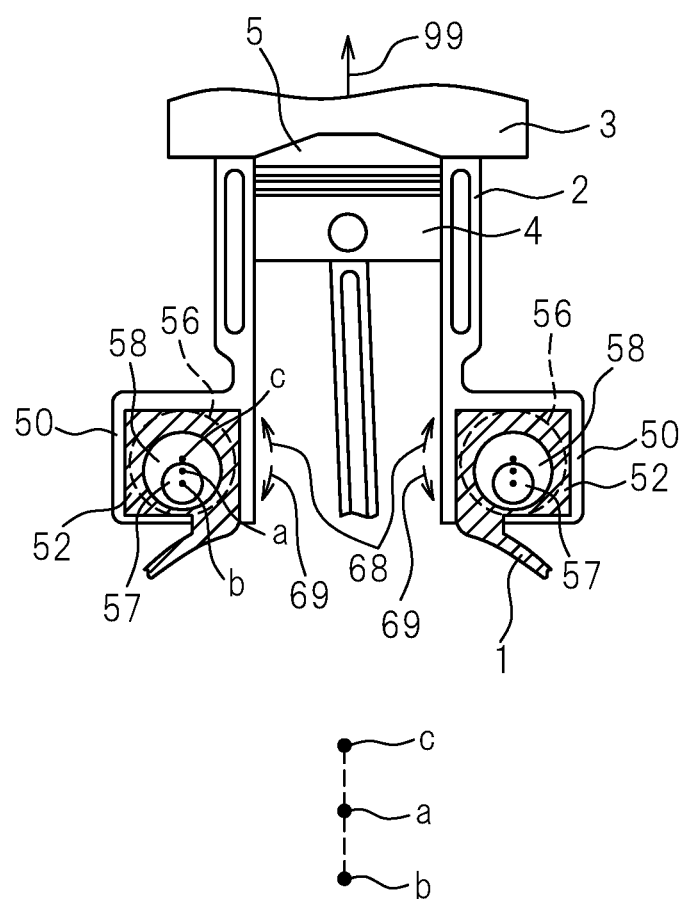
FIG. 3 is a first schematic cross-sectional view of a variable compression ratio mechanism for explaining a change in a mechanical compression ratio in an embodiment.

FIG. 2 shows a disassembled perspective view of the variable compression ratio mechanism in the present embodiment. FIG. 3 shows a first schematic cross-sectional view of the variable compression ratio mechanism in the present embodiment. Referring to FIG. 2 and FIG. 3, at the bottoms of the two side walls of the cylinder block 2, pluralities of projecting parts 50 separated from each other are formed. At the projecting parts 50, cam insertion holes 51 of circular cross-sectional shapes are formed. On the other hand, at the top wall of the crankcase 1, pluralities of projecting parts 52 separated from each other and fitting between the projecting parts 50 are formed. These projecting parts 52 are also formed with cam insertion holes 53 with circular cross-sectional shapes.

The variable compression ratio mechanism in the present embodiment includes a pair of camshafts 54 and 55. The camshafts 54 and 55 are interposed between the crankcase 1 and the cylinder block 2. On the camshafts 54 and 55, circular cams 58 inserted into the cam insertion holes to be able to rotate are arranged at every other position. These circular cams 58 are coaxial with the rotational axes of the camshafts 54 and 55. On the other hand, at the two sides of each circular cam 58, as shown in FIG. 3, eccentric shafts 57 arranged off-centered from the rotational axes of the camshafts 54 and 55 are arranged. The eccentric shafts 57 are attached so that other circular cams 56 can rotate off-centered. As shown in FIG. 2, the circular cams 56 are arranged at the two sides of each circular cam 58. These circular cams 56 are inserted into the corresponding cam insertion holes 51 to be able to rotate. The cylinder block 2 is supported at the crankcase 1 through the camshafts 54 and 55 including the eccentric shafts 57.

Figure 4:
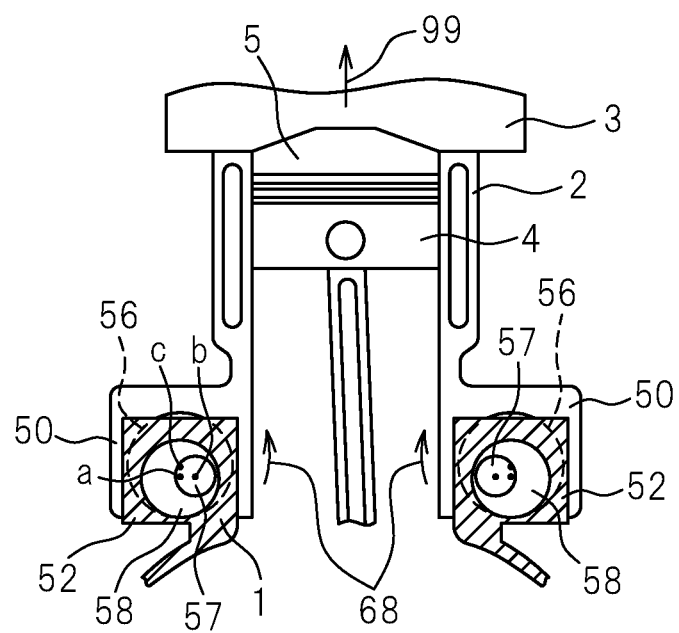
FIG. 4 is a second schematic cross-sectional view of a variable compression ratio mechanism for explaining a change in a mechanical compression ratio in an embodiment.
Figure 4:
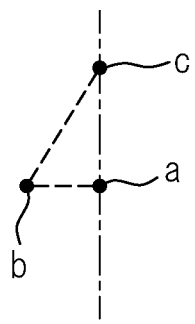
Figure 5:
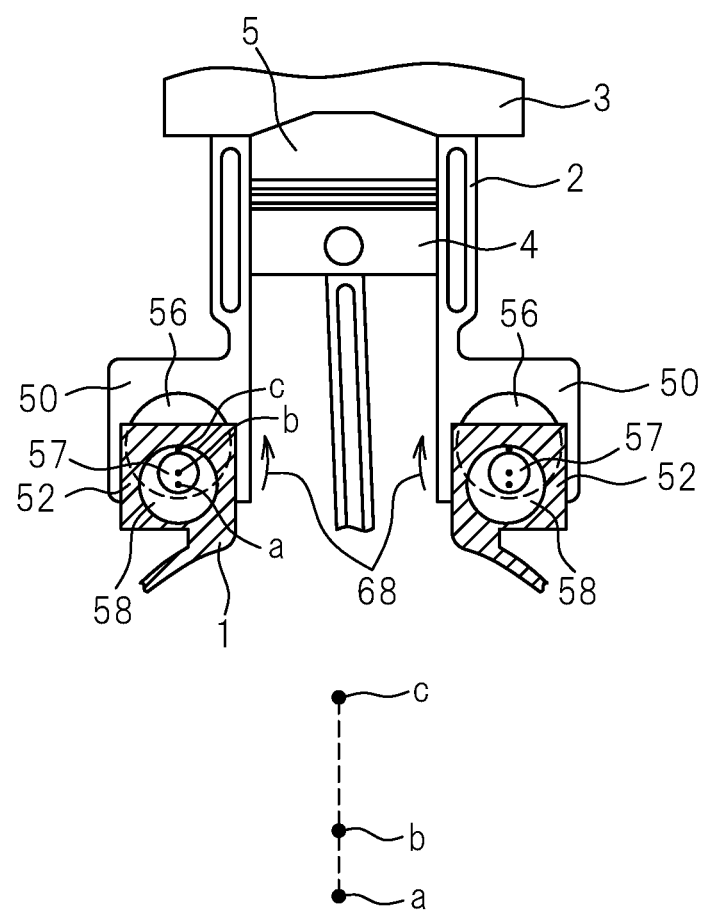
FIG. 5 is a third schematic cross-sectional view of a variable compression ratio mechanism for explaining a change in a mechanical compression ratio in an embodiment.

FIG. 4 shows a second schematic cross-sectional view of the variable compression ratio mechanism in the present embodiment. FIG. 5 shows a third schematic cross-sectional view of the variable compression ratio mechanism in the present embodiment. FIG. 3 to FIG. 5 are cross-sectional views explaining the function of the variable compression ratio mechanism when changing the mechanical compression ratio in normal operation. If making the circular cams 58 arranged on the camshafts 54 and 55 rotate in opposite directions to each other from the state shown in FIG. 3 as shown by the arrow marks 68, the eccentric shafts 57 will move in directions approaching each other. The eccentric shafts 57 rotate about the rotational axes of the respectively camshafts 54 and 55. The cylinder block 2 moves in a direction away from the crankcase 1 such as shown by the arrow mark 99. At this time, the circular cams 56 rotate inside the cam insertion holes 51 and, as shown in FIG. 4, the positions of the eccentric shafts 57 become low positions to intermediate height positions. Next, if making the circular cams 58 rotate in the direction shown by the arrow marks 68, the cylinder block 2, as shown by the arrow mark 99, moves in a direction further separating from the crankcase 1. As a result, as shown in FIG. 5, the eccentric shafts 57 become the highest positions.

FIG. 3 to FIG. 5 show the positional relationships among a center "a" of the circular cams 58, a center "b" of the eccentric shafts 57, and a center "c" of the circular cams 56 at different states. As will be understood comparing FIG. 3 to FIG. 5, the relative positions of the crankcase 1 and the cylinder block 2 are determined by the distance between the center "a" of the circular cams 58 and the center "c" of the circular cams 56. The larger the distance between the center "a" of the circular cams 58 and the center "c" of the circular cams 56, the more the cylinder block 2 is separated from the crankcase 1. That is, the variable compression ratio mechanism A uses a link mechanism using rotating cams to change the relative positions of the crankcase 1 and the cylinder block 2.

If the cylinder block 2 separates from the crankcase 1, the volume of a combustion chamber 5 when a piston 4 is positioned at compression top dead center increases. If the cylinder block 2 approaches the crankcase 1, the volume of a combustion chamber 5 when a piston 4 is positioned at compression top dead center decreases. Therefore, it is possible to change the volume of a combustion chamber 5 when a piston 4 is positioned at compression top dead center by making the camshafts 54 and 55 rotate.

As shown in FIG. 2, a pair of worms 61 and 62 with spiral directions opposite in direction are attached to a rotation shaft 60 so as to make the camshafts 54 and 55 rotate in opposite directions. Worm wheels 63 and 64 engaging with the worms 61 and 62 are respectively fastened to the end parts of the camshafts 54 and 55. In this embodiment, by driving the motor 59, the volume of a combustion chamber 5 when a piston 4 is positioned at compression top dead center can be changed over a broad range. The variable compression ratio mechanism is controlled by the electronic control unit 30. The motor 59 making the camshafts 54 and 55 rotate is connected through corresponding drive circuits 38 to the output port 36.

In this way, the variable compression ratio mechanism in the present embodiment is formed so that the volume of a combustion chamber 5 when a piston reaches top dead center can be changed by the cylinder block 2 moving relative to the crankcase 1. In the present embodiment, the compression ratio determined by only the stroke volume of a piston from bottom dead center to top dead center and the volume of a combustion chamber when a piston reaches top dead center will be called the "mechanical compression ratio". The mechanical compression ratio can be shown, without depending on the closing timing of the intake valve, by (mechanical compression ratio)=(volume of combustion chamber when piston reaches top dead center+stroke volume of piston)/(volume of combustion chamber).

In the state shown in FIG. 3, the volume of a combustion chamber 5 becomes small, and the mechanical compression ratio is high in state. When the intake air amount is constant at all times, the actual compression ratio becomes higher. As opposed to this, in the state shown in FIG. 5, the volume of a combustion chamber 5 becomes larger and the mechanical compression ratio is low in state. When the intake air amount is constant at all times, the actual compression ratio becomes lower.

The internal combustion engine in the present embodiment can change the actual compression ratio by changing the mechanical compression ratio during the operating period. For example, the variable compression ratio mechanism can be used to change the mechanical compression ratio in accordance with the operating state of the internal combustion engine.

Referring to FIG. 3 to FIG. 5, the eccentric shafts 57 rotate about the rotational axes of the camshafts 54 and 55, that is, the rotational axes of the circular cams 58. If lowering the mechanical compression ratio, the eccentric shafts 57 are made to rotate in the directions shown by the arrow marks 68. If raising the mechanical compression ratio, the eccentric shafts 57 are made to rotate in the directions shown by the arrow marks 69.

In the present embodiment, the rotational directions of the eccentric shafts 57 when making the cylinder block 2 move in a direction away from the crankcase 1 will be referred to as "first" rotational directions. Further, the rotational directions of the eccentric shafts 57 when making the cylinder block 2 move relatively in a direction approaching the crankcase 1 will be referred to as "second" rotational directions. In the present embodiment, the arrow marks 68 show the first rotational directions, while the arrow marks 69 show the second rotational directions.

Referring to FIG. 2, the variable compression ratio mechanism in the present embodiment includes a clutch 70 arranged in a drive power transmission path transmitting rotational force of the motor 59 to the camshafts 54 and 55. The clutch 70 in the present embodiment is connected at the input side to the rotation shaft 66 transmitting rotational force of the motor 59 and is connected at the output side to the rotation shaft 60 supporting the worms 61 and 62.

The clutch 70 in the present embodiment is a so-called "reverse input blocking clutch". The reverse input blocking clutch in the present embodiment is formed to transmit rotational force from the input shaft to the output shaft and to block rotational force from the output shaft. That is, the clutch 70 has a structure whereby rotational force of the rotation shaft 66 transmitted from the motor 59 is transmitted to the worms 61 and 62 and rotational force transmitted from the worms 61 and 62 is blocked and not transmitted to the motor 59.

Figure 6:
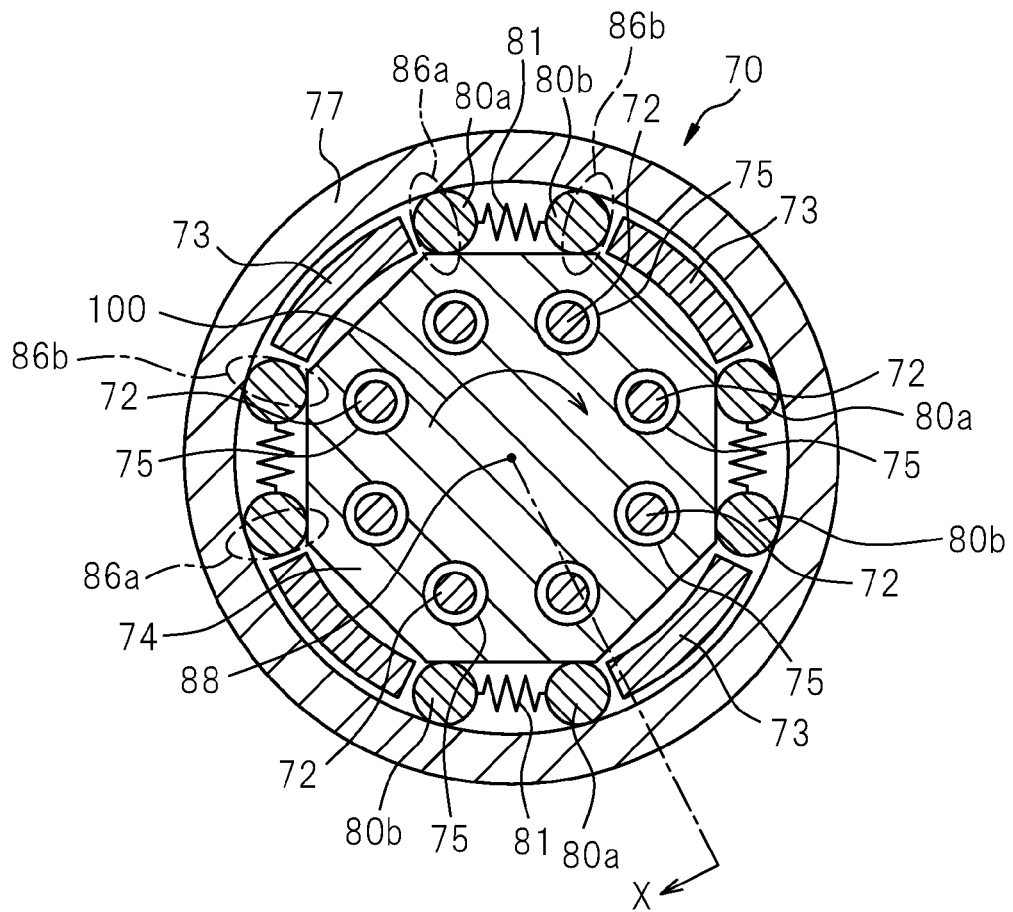
FIG. 6 is a first schematic cross-sectional view of a clutch in an embodiment.
Figure 7:
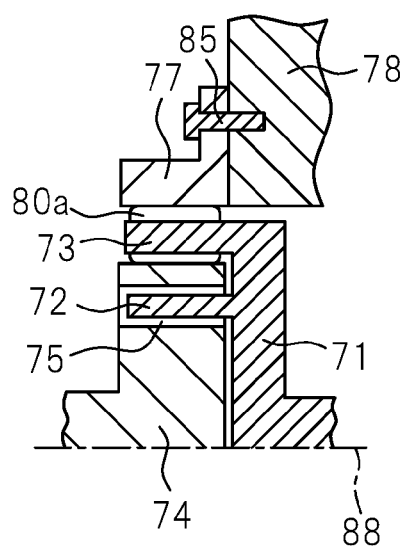
FIG. 7 is a second schematic cross-sectional view of a clutch in an embodiment.

FIG. 6 shows a first schematic cross-sectional view of the clutch 70 in the present embodiment. FIG. 7 shows a second schematic cross-sectional view of the clutch 70 in the present embodiment. FIG. 7 is a schematic cross-sectional view of the time when cut along the line X in FIG. 6.

Referring to FIG. 6 and FIG. 7, the clutch 70 of the present embodiment includes an outer race 77. The outer race 77 is fastened by screws 85 to a housing 78. The outer race 77 is fastened so as not to move even during the time period where the clutch 70 is being driven. The clutch 70 has an output shaft 74. The output shaft 74 is connected to the rotation shaft 60 to which the worms 61 and 62 are fastened. The output shaft 74 rotates about the rotation center axis 88. At the output shaft 74, hole parts 75 are formed. A plurality of hole parts 75 are formed along the peripheral direction in which the output shaft 74 rotates. The output shaft 74 in the present embodiment is formed to a polygonal cross-sectional shape. In the example shown in FIG. 6, the output shaft 74 is formed into a regular octagonal cross-sectional shape.

The clutch 70 includes an input shaft 71. The input shaft 71 rotates about a rotation center axis 88. The input shaft 71 is connected to the rotation shaft 66 transmitting rotational force of the motor 59. The input shaft 71 has insert parts 72 and holding parts 73. The insert parts 72 and holding parts 73 rotate together.

The plurality of insert parts 72 are formed at positions corresponding to the plurality of hole parts 75 of the output shaft 74. The insert parts 72 are inserted into the hole parts 75 of the output shaft 74. The inside diameters of the hole parts 75 are formed to be larger than the outside diameters of the insert parts 72. Between the insert parts 72 and hole parts 75, clearances are formed. A plurality of holding parts 73 are arranged between the outer race 77 and the output shaft 74. Further, the holding parts 73 are formed to face the rollers 80a and 80b, to push against the rollers 80a when the input shaft 71 rotates in a direction where the eccentric shafts 57 rotate in the first rotation directions, and to push against the rollers 80b when the input shaft 71 rotates in a direction where the eccentric shafts 57 rotates in the second rotation directions.

In the space between the output shaft 74 and the outer race 77, rollers 80a and 80b are arranged. The rollers 80a and 80b in the present embodiment are formed into columnar shapes. Between the rollers 80a and the rollers 80b, springs 81 are arranged. The springs 81 bias the rollers 80a and 80b to separate from each other.

Due to the output shaft 74 and outer race 77, engagement parts 86a and 86b are formed for stopping the rollers 80a and 80b. The engagement parts 86a and 86b are parts along the directions in which the rollers 80a and 80b are biased where the distances between the end face of the output shaft 74 and the inside surface of the outer race 77 gradually become narrower. Further, the engagement parts 86a and 86b are formed narrow so that the rollers 80a and 80b do not pass through them.

Next, the operation of the clutch 70 in the present embodiment will be explained. If rotational force of the motor 59 is input to the input shaft 71, the clutch 70 in the present embodiment transmits this rotational force to the output shaft 74. On the other hand, if rotational force from the camshafts 54 and 55 is transmitted to the output shaft 74, the clutch 70 is locked and blocks this rotational force. In particular, when rotational force is transmitted from the worms 61 and 62 in directions where the eccentric shafts 57 rotate in the first rotational directions, the clutch 70 blocks this rotational force.

Referring to FIG. 1, in the present embodiment, the springs 65 bias the cylinder block 2 in a direction separating from the crankcase 1. During the operating period of the internal combustion engine, due to the effects of gravity and the effects of a combustion chamber 5 becoming a negative pressure at an intake stroke of a combustion cycle, force acts in a direction whereby the cylinder block 2 approaches the crankcase 1. However, since the springs 65 are provided, the cylinder block 2 is constantly biased in a direction separating from the crankcase 1 and vibration etc. can be kept from occurring at the cylinder block 2. Furthermore, each time fuel is burned in a combustion chamber 5, due to the internal cylinder pressure, a force acts in a direction whereby the cylinder block 2 separates from the crankcase 1.

The rotational force in a direction whereby the cylinder block 2 separates from the crankcase 1 is transmitted through the camshafts 54 and 55, worm wheels 63 and 64, and worms 61 and 62 to the clutch 70. Referring to FIG. 6, the arrow mark 100 shows the direction corresponding to the direction in which the cylinder block 2 rises from the crankcase 1. That is, it shows the rotation direction where the mechanical compression ratio becomes smaller and a combustion chamber 5 when a piston 4 reaches top dead center becomes larger. The cylinder block 2 is constantly subjected to a force in a direction where it separates from the crankcase 1, and the output shaft 74 is subjected to a force in the direction shown by the arrow mark 100.

The rollers 80a are pushed against by the springs 81 to contact the engagement parts 86a. For this reason, a wedge effect occurs at the rollers 80a whereby the rotation of the output shaft 74 with respect to the outer race 77 is stopped and the output shaft 74 is locked. In this way, the clutch 70 can block the rotational force from the output side corresponding to the direction in which the cylinder block 2 separates from the crankcase 1. Further, similarly, when rotational force in the opposite direction to the arrow mark 100 is applied to the output shaft 74, the rollers 80b contact the engagement parts 86b and the output shaft 74 is locked. When not driving the motor 59, the clutch 70 locks the output shaft 74 by the rollers 80a and 80b being engaged by the engagement parts 86a and 86b.

Figure 8:
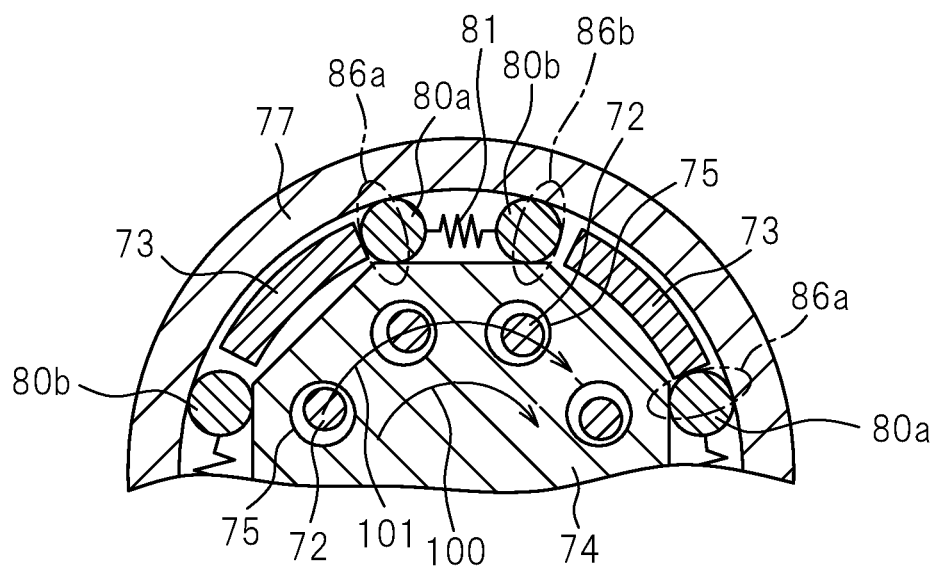
FIG. 8 is a first schematic cross-sectional view of a clutch when lowering a mechanical compression ratio in an embodiment.

FIG. 8 is a first schematic cross-sectional view of the clutch 70 for explaining the operation when lowering the mechanical compression ratio. When lowering the mechanical compression ratio, the cylinder block 2 is made to move in a direction where it separates from the crankcase 1. By driving the motor 59, the insert parts 72 of the input shaft 71 rotate in the direction shown by the arrow mark 101. Before the insert parts 72 contact the inside surfaces of the hole parts 75, the holding parts 73 contact the rollers 80a.

Figure 9:
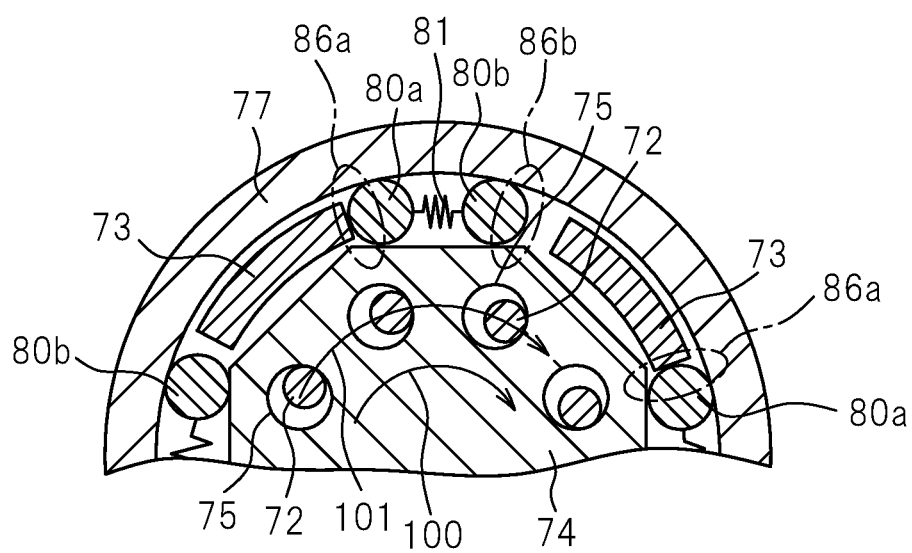
FIG. 9 is a second schematic cross-sectional view of a clutch when lowering a mechanical compression ratio in an embodiment.

FIG. 9 is a second schematic cross-sectional view of the clutch 70 for explaining the operation when lowering the mechanical compression ratio. By making the input shaft 71 further rotate, the holding parts 73 push against the rollers 80a. The rollers 80a separate from the engagement parts 86a. That is, the wedge effect of the rollers 80a disappears. For this reason, the output shaft 74 is unlocked and can rotate with respect to the outer race 77 in the direction shown by the arrow mark 101. The insert parts 72 of the input shaft 71 rotate in the direction shown by the arrow mark 101 thereby enabling the insert parts 72 to push against the hole parts 75 of the output shaft 74 and the output shaft 74 to be made to rotate. At this time, the output shaft 74 rotates in a direction whereby the rollers 80b separate from the engagement parts 86b, so the locking action by the rollers 80b is also released.

Figure 10:
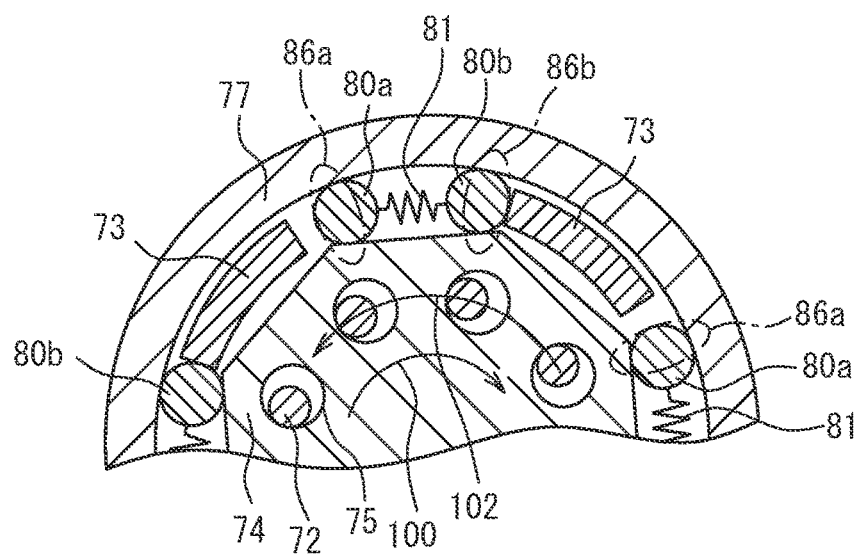
FIG. 10 is a schematic cross-sectional view of a clutch when raising a mechanical compression ratio in an embodiment.

FIG. 10 is a schematic cross-sectional view of the clutch 70 for explaining the operation when raising the mechanical compression ratio. When making the mechanical compression ratio rise, the cylinder block 2 is made to move in a direction approaching the crankcase 1. By driving the motor 59, the insert parts 72 and holding parts 73 of the input shaft 71 are made to rotate in the direction shown by the arrow mark 102.

By making the insert parts 72 and holding parts 73 of the input shaft 71 rotate in the direction shown by the arrow mark 102, the holding parts 73 push against the rollers 80b. The rollers 80b separate from the engagement parts 86b and the wedge effect of the rollers 80b disappears. Next, the insert parts 72 of the input shaft 71 push against the hole parts 75 of the output shaft 74 thereby enabling the rotational force of the input shaft 71 to be transmitted to the output shaft 74. The output shaft 74 rotates in the direction shown by an arrow mark 102. At this time, the output shaft 74 rotates in a direction whereby the rollers 80a separate from the engagement parts 86a, so the locking action by the rollers 80a is also released. In this way, rotational force of the input shaft 71 can be transmitted to the output shaft 74.

Figure 11:
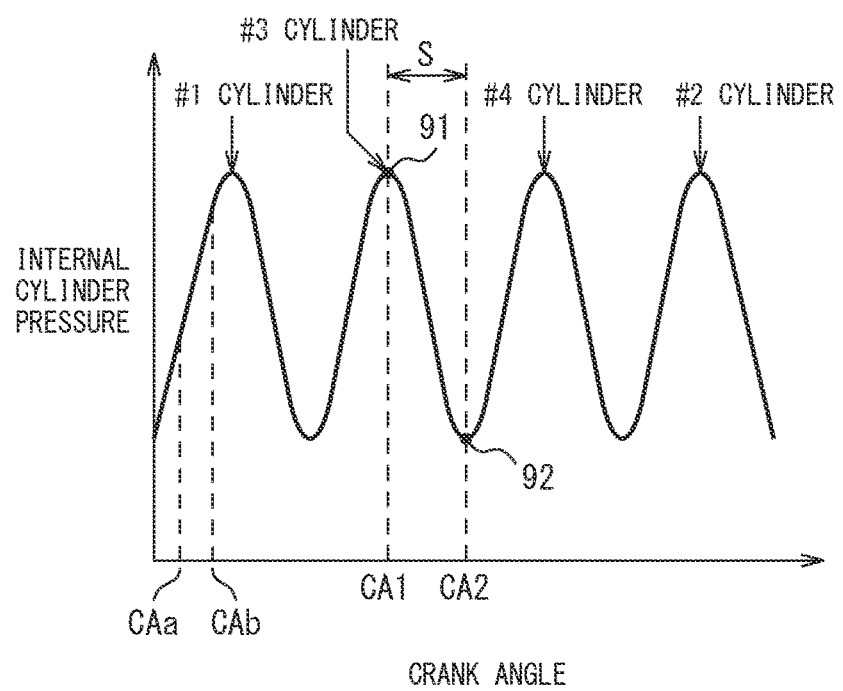
FIG. 11 is a graph of an internal cylinder pressure with respect to a crank angle of the internal combustion engine in an embodiment.

FIG. 11 shows a graph explaining the relationship between a crank angle and the internal cylinder pressure in the internal combustion engine of the present embodiment. The internal combustion engine in the present embodiment has a plurality of cylinders. In the present embodiment, four cylinders are formed. These cylinders are supplied with an air-fuel mixture of fuel and air. The fuel is ignited and burned and the internal cylinder pressure rises. FIG. 11 shows, in accordance with the firing sequence, the internal cylinder pressures of the #1 cylinder, the #3 cylinder, the #4 cylinder, and the #2 cylinder. The crank angle of the abscissa corresponds to the time. The internal cylinder pressure of the ordinate corresponds to the force acting on the cylinder block 2 through the cylinder head 3. In the internal cylinder pressure, a local maximum point 91 where the pressure becomes very large due to the fuel being burned and a local minimum point 92 where the internal cylinder pressure becomes extremely small appear.

Referring to FIG. 10, the internal cylinder pressure and the biasing force of the springs 65 cause the output shaft 74 to receive rotational force in the direction shown by the arrow mark 100. That is, the output shaft 74 receives a reverse input torque. When raising the mechanical compression ratio, the input shaft 71 rotates in the direction shown by the arrow mark 102. At the engagement parts 86a locking the reverse input torque, the input shaft 71 rotates in a direction whereby the rollers 80a separate from the engagement parts 86a. The holding parts 73 push against the rollers 80b of the engagement parts 86b at the side where the reverse input torque is not blocked, so the rollers 80b can be easily separated from the engagement parts 86b.

Referring to FIG. 8 and FIG. 9, when lowering the mechanical compression ratio, the input shaft 71 rotates in the direction shown by the arrow mark 101. The rotational direction of the input shaft 71 becomes the same as the rotational direction of the rotational force applied to the output shaft 74 shown by the arrow mark 100. The rotational force applied to the output shaft 74 depends on the internal cylinder pressure. If the internal cylinder pressure becomes high, the rotational force applied to the output shaft 74 also becomes larger.

Figure 12:
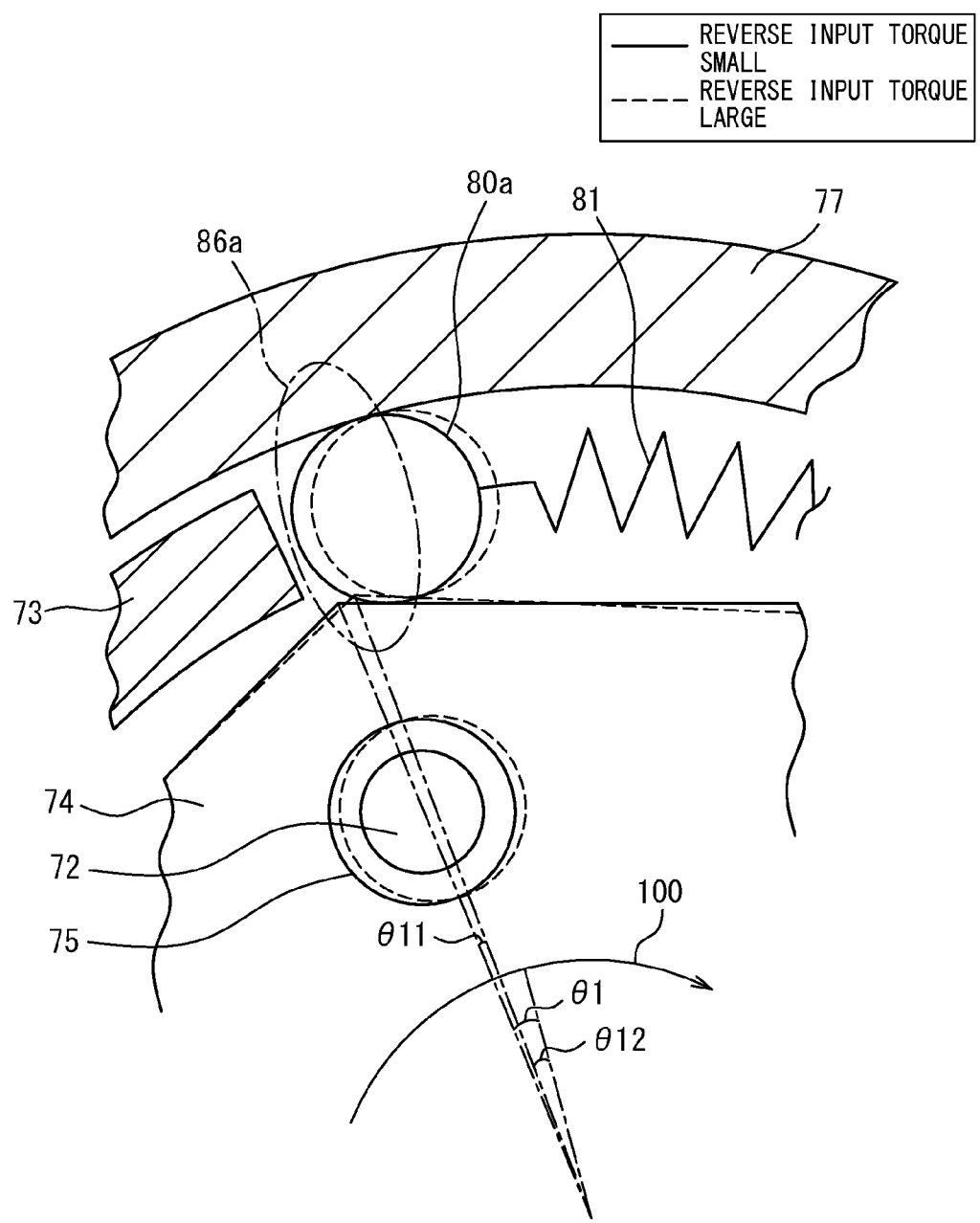
FIG. 12 is an enlarged schematic cross-sectional view of a clutch for explaining a displacement angle.

FIG. 12 shows an enlarged schematic cross-sectional view of a clutch in the present embodiment. FIG. 12 explains the operating state of the clutch in the case of maintaining the mechanical compression ratio constant. The outer edges of the output shaft 74 and rollers 80a when the rotational force applied to the output shaft 74 is small are shown by the solid lines. Further, the outer edges of the output shaft 74 and rollers 80a when the rotational force applied to the output shaft 74 is large are shown by the broken lines.

Due to the increase in the rotational force applied to the output shaft 74, the output shaft 74 deforms slightly from the input shaft 71 in the direction shown by the arrow mark 100. After that, if the rotational force applied to the output shaft 74 decreases, the output shaft 74 returns to its original state. In this way, the output shaft 74 elastically deforms and the rollers 80a cut into the engagement parts 86a. As a result, the displacement angle θ1 about the center axis of the output shaft 74 with respect to the input shaft 71 changes. The displacement angle θ1 elastically changes in accordance with the magnitude of the rotational force applied to the output shaft 74. The displacement angle θ1 includes the displacement angle θ11 due to rotation due to the rollers 80a cutting into the engagement parts 86a and the displacement angle θ12 due to the deformation of the output shaft 74 itself. That is, the displacement angle θ1 becomes the sum of the displacement angle θ11 and the displacement angle θ12.

Referring to FIG. 11, for example, if comparing the internal cylinder pressures at the reference crank angles CAa and CAb, the internal cylinder pressure at the crank angle CAb is higher than the internal cylinder pressure at the crank angle CAa. From the crank angle CAa to the crank angle CAb, the internal cylinder pressure rises. Referring to FIG. 12, when the internal cylinder pressure rises, the displacement angle θ1 increases. That is, the rollers 80a increase in amount they cut into the engagement parts 86a and, further, the amount of deformation of the output shaft 74 itself increases. To lower the mechanical compression ratio at this time, a large force becomes necessary even if using the holding parts 73 to push against the rollers 80a to try to release the locking action on the rollers 80a.

On the other hand, when the internal cylinder pressure falls, the displacement angle θ1 decreases. The rollers 80a move relatively in a direction separating from the engagement parts 86a. At this time, if the holding parts 73 push against the rollers 80a, separation of the rollers 80a from the engagement parts 86a can be promoted and a small force can be used to release the engaged state of the rollers 80a.

Referring to FIG. 11, for example, in the time period S from the crank angle CA1 to the crank angle CA2, the internal cylinder pressure decreases and the displacement angle θ1 decreases. To lower the mechanical compression ratio, by starting to push against the rollers 80a in the time period of transition of the internal cylinder pressure from the local maximum point 91 to the local minimum point 92, it is possible to release the engaged state of the rollers 80a by a small force. In the present embodiment, the motor 59 of the drive device starts to be operated at the local maximum point 91 of the internal cylinder pressure.

Here, if the time period S passes, the internal cylinder pressure again rises. The rise of the internal cylinder pressure acts in a direction increasing the displacement angle θ1. For this reason, the separation of the rollers 80a from the engagement parts 86a preferably is completed within the time period S where the internal cylinder pressure decreases. That is, it is preferable that the rollers 80a separate from the engagement parts 86a within the time period of the time period S. The control device of the present embodiment controls the motor 59 so that the rollers 80a separate from the engagement parts 86a before the end of the time period S of the transition of the internal cylinder pressure from the local maximum point 91 to the local minimum point 92.

By releasing the locked state of the clutch 70 during the time period of transition of the internal cylinder pressure from the local maximum point 91 to the local minimum point 92, it is possible to release the locked state of the clutch 70 by a small drive force. It is possible to release the lock of the clutch 70 by a small force and to reduce the size of the motor 59. Alternatively, the motor 59 can be made smaller in size. Alternatively, it is possible to reduce the amount of consumed power of the drive device driving the variable compression ratio mechanism.

In this regard, if continuing to use the internal combustion engine, abnormality of the variable compression ratio mechanism, aging deterioration of the parts forming the eccentric shafts, etc. can sometimes cause fluctuation of the internal cylinder pressure to not be sufficiently transmitted to the output shaft 74 of the clutch 70. For example, wear of the bearings of the eccentric shafts, a drop in power transmission efficiency by the worm gears due to runout, etc. can sometimes cause the fluctuations in rotational force due to internal cylinder pressure to be insufficiently transmitted to the output shaft 74 of the clutch 70. Alternatively, degradation of the lubricating oil lubricating the mechanisms of the eccentric shafts can sometimes cause fluctuations in the internal cylinder pressure to be insufficiently transmitted to the output shaft 74. As a result, sometimes the amplitude of vibration of the reverse input torque applied to the output shaft 74 of the clutch 70 becomes small.

Figure 13:
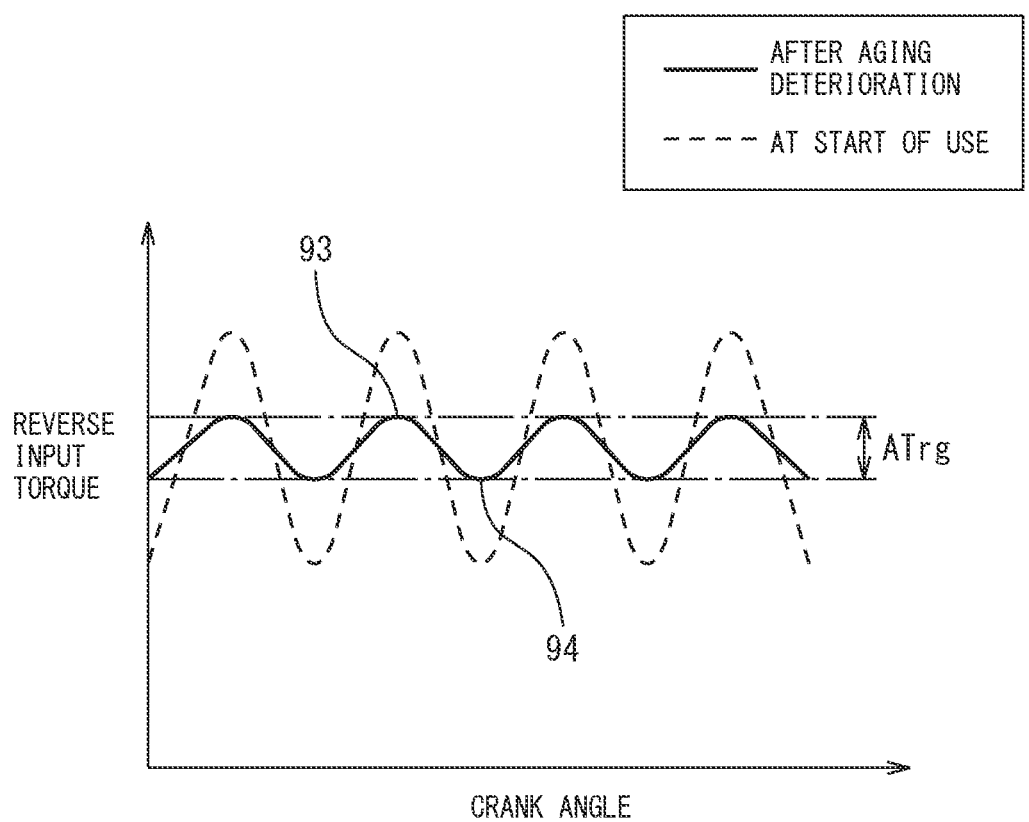
FIG. 13 is a graph of reverse input torque of a clutch with respect to a crank angle of the internal combustion engine in an embodiment.

FIG. 13 shows a graph of the crank angle and the reverse input torque applied to the output shaft of the clutch. FIG. 13 shows a graph of the time of start of use of the variable compression ratio mechanism and a graph at the time of aging deterioration. The reverse input torque applied to the output shaft 74 vibrates by a period similar to the period of vibration of the internal cylinder pressure (see FIG. 11). At the time of start of use of the variable compression ratio mechanism, for example, at the time of a new part, there is no aging deterioration, so the amplitude of the reverse input torque becomes large. As opposed to this, at the time of aging deterioration or at the time of abnormality of the variable compression ratio mechanism, the amplitude of the reverse input torque decreases and becomes small.

The amount of change of the displacement angle θ1 of the output shaft 74 corresponds to the reverse input torque applied to the output shaft 74. The smaller the reverse input torque, the smaller the amount of change of the displacement angle θ1. For this reason, when performing control for releasing the locked state of the clutch 70 during the time period of transition of the internal cylinder pressure from the local maximum point 91 to the local minimum point 92, if the amplitude of the vibration of the reverse input torque becomes small, release of the locked state of the clutch 70 becomes difficult. In particular, release of the locked state of the clutch 70 becomes difficult when lowering the mechanical compression ratio.

The internal combustion engine of the present embodiment changes the mechanical compression ratio to a predetermined low mechanical compression ratio when the amplitude of the vibration of the reverse input torque applied to the output shaft becomes smaller than a predetermined judgment value. Further, control is performed to prohibit change of the mechanical compression ratio. That is, regardless of the operating state of the internal combustion engine, control is performed to fix the mechanical compression ratio at a predetermined low level.

The internal combustion engine of the present embodiment is provided with a rotational force estimating device estimating the rotational force applied to the output shaft 74 of the clutch 70 during the operating period. Referring to FIG. 2, the rotational force estimating device of the present embodiment includes a torque detection device detecting a reverse input torque of the output shaft 74 of the clutch 70. The torque detection device includes a torque detector 89.

The torque detector 89 of the present embodiment is a strain gauge type detecting torsion of the output shaft 74 and using the detected torsion as the basis to detect the reverse input torque applied to the output shaft 74. The torque detection device is not limited to this. Any device measuring the torque applied to the output shaft 74 can be employed. For example, as the torque detection device, a magnetostriction type of torque sensor may also be employed.

Referring to FIG. 13, the internal combustion engine of the present embodiment detects the amount of torsion of the output shaft 74 detected at the torque detection device and uses the detected amount of torsion as the basis to estimate the reverse input torque of the local maximum point 93 and reverse input torque of the local minimum point 94. Further, the amplitude ATq of the reverse input torque is calculated based on the local maximum value and local minimum value of the reverse input torque. In calculating the amplitude ATq, it is possible to calculate a single amplitude ATq based on one local maximum point 93 and one local minimum point 94. Alternatively, it is possible to employ the average value of a plurality of amplitudes ATq based on a plurality of local maximum points 93 and a plurality of local minimum points 94.

Next, it is judged if the amplitude ATq of the reverse input torque is smaller than a predetermined judgment value of amplitude. If the amplitude ATq of the reverse input torque is smaller than a predetermined judgment value of amplitude, it can be judged that the amplitude of the vibration of the reverse input torque when releasing the locked state of the clutch 70 is insufficient for lowering the mechanical compression ratio.

When it is judged that the amplitude of the vibration of the reverse input torque for releasing the locked state of the clutch 70 is insufficient, control is performed to change the mechanical compression ratio to a predetermined low mechanical compression. As the mechanical compression ratio at this time, it is possible to employ a for example 10 or so low mechanical compression ratio. Next, regardless of the operating state of the internal combustion engine, the mechanical compression ratio is fixed to this low mechanical compression ratio. That is, control is performed to prohibit change of the mechanical compression ratio.

By fixing the internal combustion engine at a low mechanical compression ratio, it is possible to keep abnormality of the variable compression ratio mechanism, aging deterioration of the parts forming the eccentric shaft, etc. from making release of the lock of the clutch difficult. Further, by fixing the mechanical compression ratio at a low level, it is possible to keep down abnormal combustion at a combustion chamber. The internal combustion engine of the present embodiment performs control to notify the user of any abnormality in the variable compression ratio mechanism. For example, control is performed to turn on a warning light arranged at the instrument panel in front of the driver's seat. While the mechanical compression ratio is fixed at a low state, it is possible to drive to a repair shop and get it repaired.

In the above embodiment, the local maximum value and the local minimum value of the reverse input torque are estimated to calculate the amplitude ATq of the reverse input torque, but the invention is not limited to this. It is possible to perform control able to judge if the amplitude of vibration of the reverse input torque is less than the judgment value. For example, when detecting the maximum value of the reverse input torque (local maximum value) at a predetermined operating state of the internal combustion engine and the detected maximum value of the reverse input torque is smaller than a predetermined judgment value of the maximum value, it can be judged that the amplitude of vibration of the reverse input torque is less than a predetermined judgment value of the amplitude.

Figure 14:
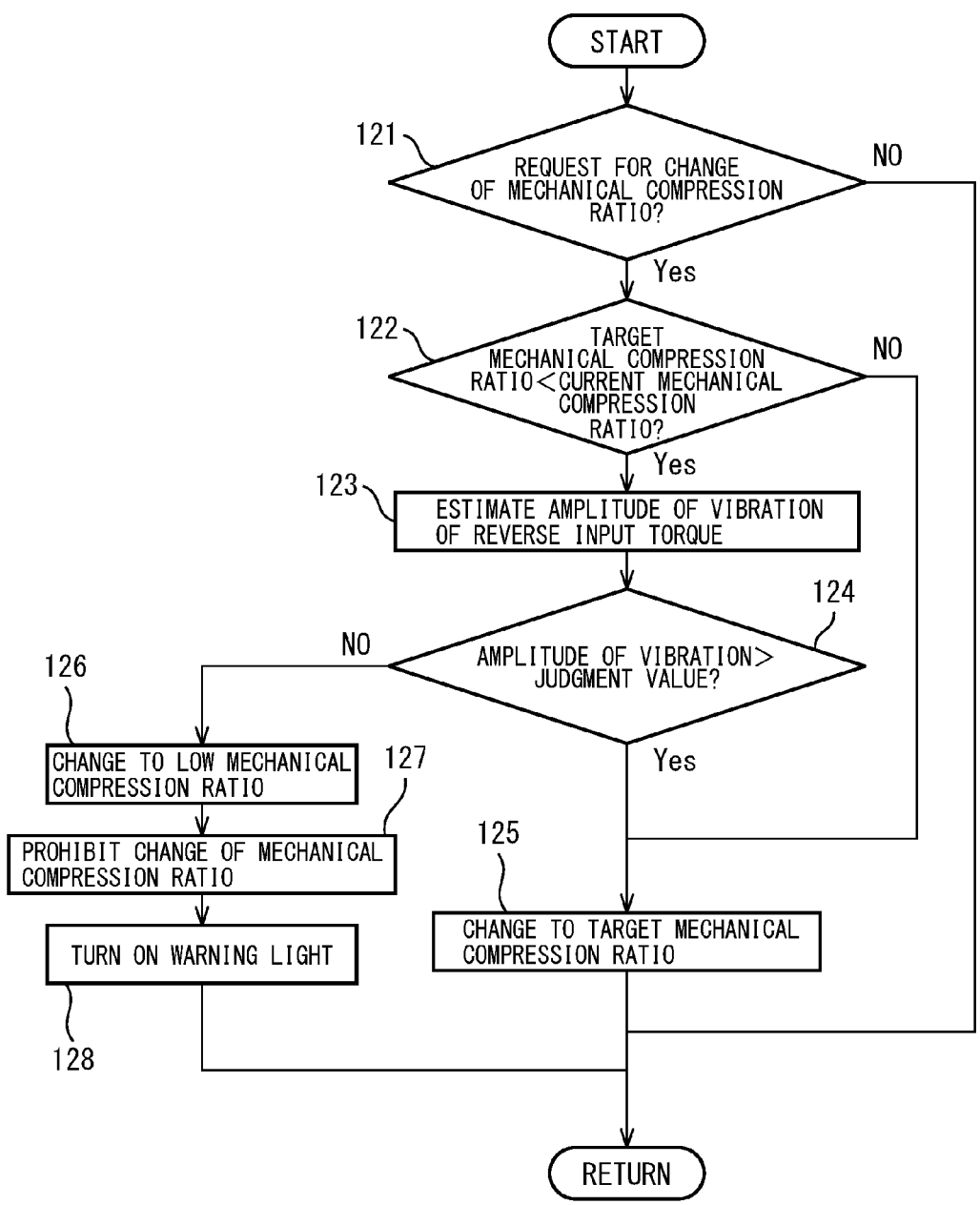
FIG. 14 is a flow chart of operational control of an internal combustion engine in an embodiment.

FIG. 14 is a flow chart of operational control of the internal combustion engine in the present embodiment. This operational control can, for example, be repeatedly performed every predetermined time interval.

At step 121, it is judged if there is a request for change of the mechanical compression ratio. The mechanical compression ratio is selected based on the operating state of the internal combustion engine. The target mechanical compression ratio is set accordingly. The mechanical compression ratio is, for example, set as a function of the engine speed and fuel injection amount etc. If, at step 121, there is no request for change of the mechanical compression ratio, this control routine is ended. If, at step 121, there is a request for changing the mechanical compression ratio, the routine proceeds to step 122.

At step 122, it is judged if the target mechanical compression ratio is smaller than the current mechanical compression ratio. That is, it is judged whether to decrease the mechanical compression ratio. If, at step 122, the target mechanical compression ratio is larger than the current mechanical compression ratio, the routine proceeds to step 125. That is, when raising the mechanical compression ratio, the routine proceeds to step 125. At step 125, the mechanical compression ratio is changed to the target mechanical compression ratio.

On the other hand, if, at step 122, the target mechanical compression ratio is less than the current mechanical compression ratio, the routine proceeds to step 123. That is, when lowering the mechanical compression ratio, the routine proceeds to step 123.

At step 123, the amplitude of the vibration of the rotational force applied to the output shaft 74 of the clutch 70 by the internal cylinder pressure and springs 65, that is, the amplitude of the vibration of the reverse input torque applied to the output shaft of the clutch 70, is detected.

Next, at step 124, it is judged if the amplitude of the vibration of the reverse input torque applied to the output shaft of the clutch 70 is larger than a predetermined judgment value of amplitude. If the amplitude of the vibration of the reverse input torque applied to the output shaft of the clutch 70 is larger than a predetermined judgment value of amplitude, it can be judged that the locked state of the clutch 70 can be released. In this case, the routine proceeds to step 125 where the mechanical compression ratio is changed to the target mechanical compression ratio.

When the amplitude of the vibration of the reverse input torque applied to the output shaft of the clutch 70 is a predetermined judgment value of amplitude or less, it is possible to judge that release of the locked state of the clutch 70 would be difficult. In this case, the routine proceeds to step 126.

At step 126, the mechanical compression ratio is changed to a predetermined low mechanical compression ratio. Further, at step 127, future change of the mechanical compression ratio is prohibited. Control is performed to fix the mechanical compression ratio at a predetermined low mechanical compression ratio. Next, at step 128, a warning light showing that the variable compression ratio mechanism is abnormal is turned on and this control is ended.

In the drive device of the variable compression ratio mechanism in the present embodiment, a motor 59 is employed as a rotary machine, but the invention is not limited to this. Any rotary machine making the input shaft 71 of the clutch 70 rotate may be employed.

The clutch 70 in the present embodiment is arranged between the motor 59 and the worm 62, but the invention is not limited to this. It can be placed at the drive power transmission path transmitting the rotational force of the motor 59 to the eccentric shaft 57. For example, clutches 70 may be arranged between the worm wheels 63 and 64 and the camshafts 54 and 55. In this case, clutches are arranged at these camshafts 54 and 55.

The clutch in the present embodiment is formed so as to transmit to the output shaft the rotational force from the input shaft in both directions of the rotational direction where the mechanical compression ratio rises and the rotational direction where the mechanical compression ratio falls and to block the rotational forces of the two directions from the output shaft. The clutch is not limited to this. It may also be configured to transmit rotational force from the input shaft in the two directions to the output side and to block rotational force from the output shaft in the rotational direction where the mechanical compression ratio falls.

In the above-mentioned internal combustion engine, if the amplitude of the vibration of the reverse input torque applied to the output shaft becomes smaller than a predetermined judgment value, control is performed to change the mechanical compression ratio to a predetermined low mechanical compression ratio and then to prohibit change of the mechanical compression ratio, but the invention is not limited to this. It is also possible to prohibit the rise of the mechanical compression ratio if the mechanical compression ratio is small when the amplitude of the vibration of the reverse input torque applied to the output shaft becomes smaller than a predetermined judgment value. For example, when the amplitude of the vibration of the reverse input torque applied to the output shaft becomes smaller than a predetermined judgment value, control may be performed to prohibit the rise of the mechanical compression ratio if the mechanical compression ratio is smaller than a predetermined judgment value. Alternatively, control may be performed to maintain the mechanical compression ratio at the level at that time.

In the above-mentioned internal combustion engine, control is performed so that, when lowering the mechanical compression ratio, the rotary machine starts to drive the input shaft of the clutch during the time period when the internal cylinder pressure transits from a local maximum point to a local minimum point, but the invention is not limited to this. When lowering the mechanical compression ratio, it is possible to start to drive the input shaft of the clutch at any timing. For example, the control device can perform control to release the locked state of the clutch in the time period when the internal cylinder pressure is low. The control device can perform control to acquire the internal cylinder pressure and release the locked state of the clutch in the time period when the internal cylinder pressure becomes less than a predetermined judgment value. Even if performing such control, if the amplitude of vibration of the reverse input torque becomes smaller, it becomes difficult to release the locked state of the clutch. For this reason, the control device can perform control to fix the mechanical compression ratio at a predetermined low mechanical compression ratio when the amplitude of vibration of the rotational force applied to the output shaft of the clutch is less than a predetermined judgment value.

Further, the above-mentioned variable compression ratio mechanism is formed to be able to change a mechanical compression ratio by being interposed between the support structure and cylinder block, including shafts including eccentric shafts, and changing a relative position of the cylinder block with respect to the support structure, but the invention is not limited to this. The present invention may also be applied to a variable compression ratio mechanism including eccentric shafts for changing a volume of a combustion chamber when a piston reaches top dead center and a drive device for making the eccentric shafts rotate.

In the present embodiment, the explanation was given illustrating an internal combustion engine mounted in a vehicle, but the invention is not limited to this. The present invention can be applied to an internal combustion engine arranged at any apparatus or facility etc.

In the above figures, the same or equivalent parts are assigned the same reference notations. Further, in the above control routines, the orders of the steps can be suitably changed within an extent where the functions and actions are not changed. Note that, the above-mentioned embodiments are illustrative and do not restrict the invention. Further, in the embodiments, changes shown in the claims are included.

REFERENCE SIGNS LIST 1 crankcase
2 cylinder block
4 piston
5 combustion chamber
22 relative position sensor
30 electronic control unit
42 crank angle sensor
54, 55 camshaft
56, 58 circular cam
57 eccentric shaft
59 motor
65 spring
70 clutch
71 input shaft
73 holding part
74 output shaft
80a, 80b rollers
86a, 86b engagement parts
89 torque detector
91 local maximum point
92 local minimum point
A variable compression ratio mechanism

The invention claimed is:
1. An internal combustion engine comprising:
a variable compression ratio mechanism able to change a mechanical compression ratio; and
a control device controlling the variable compression ratio mechanism; wherein
the variable compression ratio mechanism includes an eccentric shaft for changing a volume of a combustion chamber when a piston reaches top dead center and a drive device for making the eccentric shaft rotate,
the drive device includes a rotary machine and a clutch in a drive power transmission path for transmitting rotational force of the rotary machine to the eccentric shaft,
the clutch is formed so as to block rotational force from the output shaft in a rotation direction lowering a mechanism compression ratio transmitted to the output shaft,
a rotational force estimating device estimating a rotational force applied to the output shaft of the clutch is further provided, and
the control device fixes the mechanical compression ratio at a predetermined low mechanical compression ratio when an amplitude of vibration of rotational force applied to the output shaft of the clutch is less than a predetermined judgment value.

2. The internal combustion engine according to claim 1, wherein the control device prohibits change of the mechanical compression ratio after fixing the mechanical compression ratio at a predetermined low mechanical compression ratio when an amplitude of vibration of rotational force applied to the output shaft of the clutch is less than a predetermined judgment value.

3. The internal combustion engine according to claim 1, wherein the control device controls the rotary machine so as to start driving the input shaft of the clutch during a time period when an internal cylinder pressure transits from a local maximum point to a local minimum point when lowering the mechanical compression ratio.

4. The internal combustion engine according to claim 1, wherein the control device detects a local maximum point and a local minimum point of vibration of rotational force applied to the output shaft of the clutch and calculates an amplitude of vibration based on the local maximum point and the local minimum point.

5. The internal combustion engine according to claim 1, further comprising:
- a support structure including a crankcase and
- a cylinder block supported by the support structure; wherein
- the variable compression ratio mechanism is interposed between the support structure and the cylinder block and includes a shaft including the eccentric shaft and the drive device making the shaft rotate and is formed to be able to change the mechanical compression ratio by changing a relative position of the cylinder block with respect to the support structure.

* * * * *